US012120495B2

(12) United States Patent
Ren et al.

(10) Patent No.: US 12,120,495 B2
(45) Date of Patent: Oct. 15, 2024

(54) COAXIAL SPEAKER

(71) Applicant: AAC Microtech (Changzhou) Co., Ltd., Changzhou (CN)

(72) Inventors: Zhang Ren, Shenzhen (CN); Zhiwei Zhong, Shenzhen (CN)

(73) Assignee: AAC Microtech (Changzhou) Co., Ltd., Changzhou (CN)

(*) Notice: Subject to any disclaimer, the term of this patent is extended or adjusted under 35 U.S.C. 154(b) by 195 days.

(21) Appl. No.: 18/073,524

(22) Filed: Dec. 1, 2022

(65) Prior Publication Data

US 2024/0073611 A1 Feb. 29, 2024

Related U.S. Application Data

(63) Continuation of application No. PCT/CN2022/115651, filed on Aug. 30, 2022.

(51) Int. Cl.

*H04R 9/02* (2006.01)
*H04R 7/16* (2006.01)

(52) U.S. Cl.

CPC ............... *H04R 9/025* (2013.01); *H04R 7/16* (2013.01); *H04R 2400/11* (2013.01)

(58) Field of Classification Search

CPC ....... H04R 9/025; H04R 7/16; H04R 2400/11
See application file for complete search history.

(56) References Cited

U.S. PATENT DOCUMENTS

2023/0292037 A1* 9/2023 Xu ........................... H04R 1/24
2024/0073613 A1* 2/2024 Ren .......................... H04R 1/24
2024/0073614 A1* 2/2024 Ren ........................ H04R 9/025

* cited by examiner

*Primary Examiner* — Andrew Sniezek
(74) *Attorney, Agent, or Firm* — W&G Law Group

(57) ABSTRACT

The present invention provides a coaxial speaker including a frame, a magnetic circuit system, a first vibration system, and a second vibration system. The second vibration system locates coaxially with the first vibration system. The first vibration system includes a first diaphragm and a first voice coil, the second vibration system includes a second diaphragm and a second voice coil. The magnetic circuit system includes a magnetic guiding plate, a first magnet, a second magnet forming a first magnetic gap with the first magnet, a third magnet, and a forth magnet. The forth magnet, the magnetic guiding plate, and the second magnet stack in sequence and form a second magnetic gap with the third magnet. The coaxial speaker has a common magnetic circuit system for sounding on the front and back sides, which can not only form a full-range speaker, but also can function as a receiver.

10 Claims, 4 Drawing Sheets

COAXIAL SPEAKER

FIELD OF THE PRESENT INVENTION

The present invention relates to the field of electro-acoustic conversion, and more particularly, to a coaxial speaker.

DESCRIPTION OF RELATED ART

Coaxial speaker refers to the speaker with the integration of the treble unit and bass unit, and the treble unit and bass unit are set coaxially. The sound source of the treble unit and bass unit of the coaxial speaker can be located in front of the coaxial speaker, that is, the two speaker units sounding along a same direction. The sound source of the treble unit and bass unit of the coaxial speaker can also be located in front and back of the coaxial speaker respectively, that is, the two speaker units sounding along different directions.

In related art, the treble unit and bass unit of the coaxial speaker usually each includes an independent vibration system and an independent magnetic circuit system, and the structure of the coaxial speaker is complex. The overall height of the coaxial speaker composed of the treble unit and the bass unit is increased, which leads to inconvenient installation due to the high height and reduces the applicability of the product. In addition, the separated treble magnetic circuit and bass magnetic circuit also increase the production cost, and reduce the market competitiveness of the product. The application scenario of the product is single.

Therefore, it is desired to provide a new coaxial speaker which can overcome the above problems.

SUMMARY

In view of the above, the embodiment of the present invention provides a new coaxial speaker. By the present invention, the coaxial speaker has a compact structure and with high sound quality of the treble sound and bass sound, and the coaxial speaker also can function as a receiver.

The present invention provides a coaxial speaker including a frame, a magnetic circuit system mounted on the frame, a first vibration system fixed on a side of the frame distal to the magnetic circuit system, and a second vibration system fixed on a side of the magnetic circuit system distal to the frame. The second vibration system locates coaxially with the first vibration system. The first vibration system includes a first diaphragm and a first voice coil driving the first diaphragm to generate sounds, and the second vibration system includes a second diaphragm and a second voice coil driving the second diaphragm to generate sounds. The magnetic circuit system includes a magnetic guiding plate, a first magnet disposed on a side of the magnetic guiding plate proximal to the first diaphragm, a second magnet surrounding the first magnet and spaced apart from the first magnet to form a first magnetic gap, a third magnet surrounding the second magnet and spaced apart from the second magnet, and a forth magnet fixed on a side of the magnetic guiding plate proximal to the second diaphragm. The forth magnet, the magnetic guiding plate, and the second magnet stacked in sequence and forming a second magnetic gap with the third magnet. The first voice coil at least partially locates into the first magnetic gap, and the second voice coil at least partially locates into the second magnetic gap.

As an improvement, the first magnet, the second magnet, the third magnet, and the forth magnet are magnetized along a vibration direction of the coaxial speaker, and the first magnet, the third magnet, and the forth magnet are magnetized in same directions, and the first magnet and second magnet are magnetized in opposite directions.

As an improvement, the magnetic circuit system includes a magnetic bowl supporting the second magnet and the third magnet, a first pole plate stacked under the first magnet, and a second pole plate stacked above the third magnet, the magnetic bowl mounted on a side of the frame away from the first diaphragm.

As an improvement, the coaxial speaker further includes a first circuit board powering the first voice coil, the first circuit board including a first fixing portion sandwiched between the first diaphragm and the first voice coil, a second fixing portion sandwiched between the first diaphragm and the frame, an elastic first connecting portion connecting the first fixing portion and the second fixing portion, and a welding portion bending and extending from the second fixing portion to the second pole plate.

As an improvement, a number of the first fixing portions is two, both sides of the first voice coil providing with one first fixing portion, and the first circuit board further including a second connecting portion connecting the two first fixing portions.

As an improvement, the first diaphragm includes a first dome, a first suspension surrounding the first dome and the first suspension connected to the second connecting portion of the first circuit board.

As an improvement, an avoiding portion is provided on the magnetic bowl and the third magnet corresponding to a position of the welding portion for avoiding the welding portion.

As an improvement, the coaxial speaker further includes a support shelf, the second diaphragm including a second dome, a second suspension surrounding the second dome, a third suspension surrounding the second suspension and spaced apart from the second suspension, and a third dome located between the second suspension and the third suspension, the second dome fixed attached to the forth magnet, and the third suspension fixed attached to the support shelf.

As an improvement, the second vibration system further includes a voice coil support connecting the second diaphragm, the coaxial speaker further including an elastic assembly elastically suspending the second vibration system, the voice coil support including a flat portion attached to the third dome, a first extending portion bending and extending from one end of the flat portion to the second voice coil and connected to the second voice coil, and a second extending portion bending and extending from the other end of the flat portion to the elastic assembly and connected to the elastic assembly.

As an improvement, a leakage channel is provided of the frame, the leakage channel communicating an outside world to a space enclosed by the first diaphragm and the magnetic circuit system.

BRIEF DESCRIPTION OF THE DRAWINGS

Many aspects of the exemplary embodiment can be better understood with reference to the following drawing. The components in the drawing are not necessarily drawn to scale, the emphasis instead being placed upon clearly illustrating the principles of the present invention. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of the present invention more apparent, the present invention is described in further detail together with the figures and the embodiments. It should be understood the specific embodiments described hereby is only to explain the disclosure, not intended to limit the disclosure.

Figure 1:
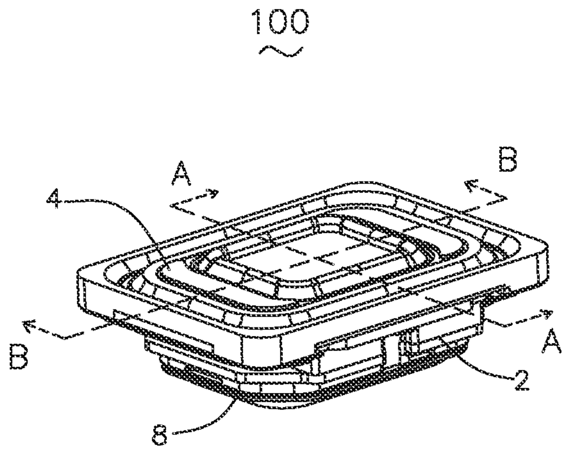
FIG. 1 is an illustrative isometric view of a coaxial speaker in accordance with one embodiment of the present invention.
Figure 2:
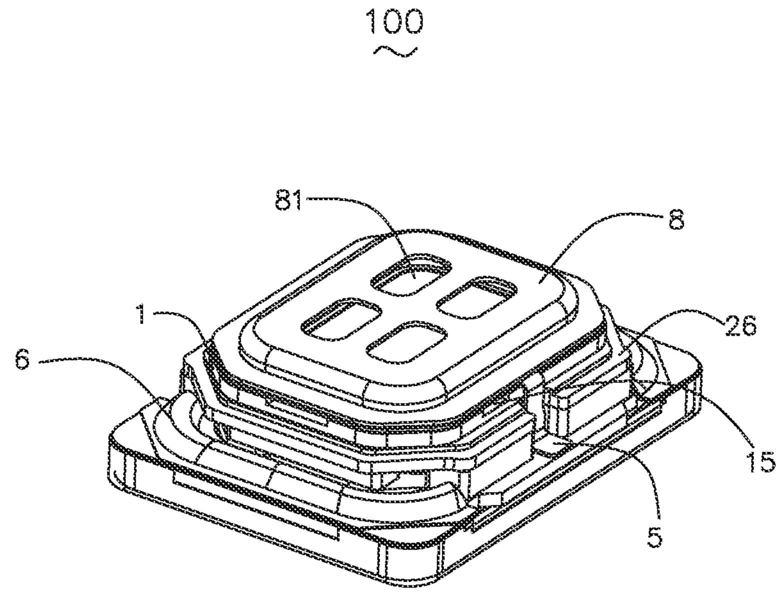
FIG. 2 is another illustrative isometric view of the coaxial speaker of FIG. 1 from another perspective.
Figure 3:
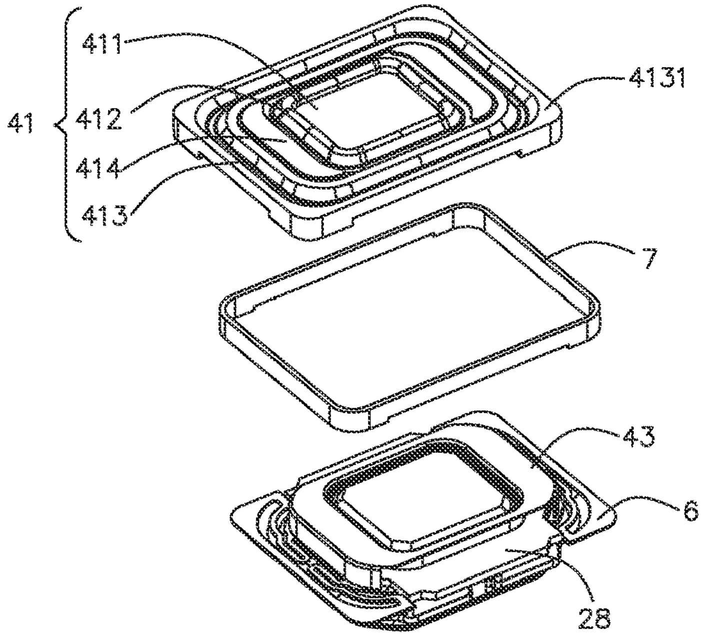
FIG. 3 is a partially exploded view of the coaxial speaker of FIG. 1.
Figure 4:
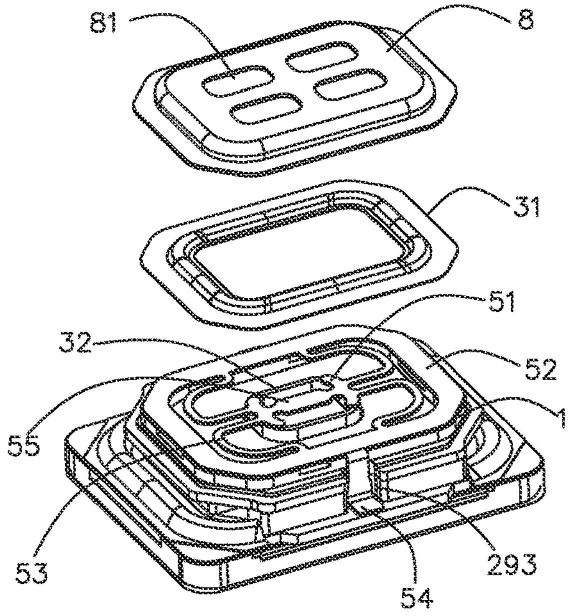
FIG. 4 is another partially exploded view of the coaxial speaker of FIG. 1 from another perspective.
Figure 5:
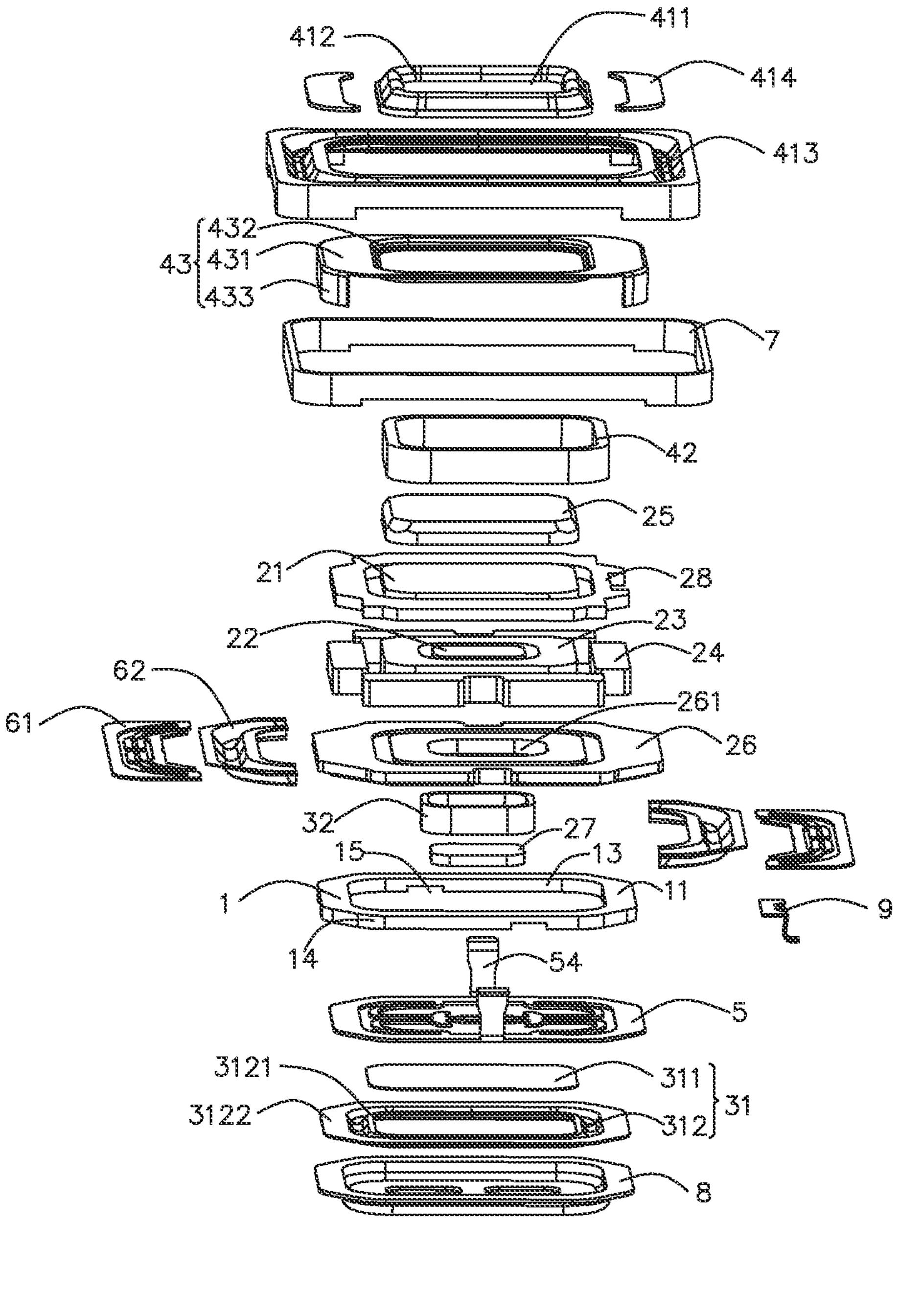
FIG. 5 is an exploded view of the coaxial speaker of FIG. 1.
Figure 6:
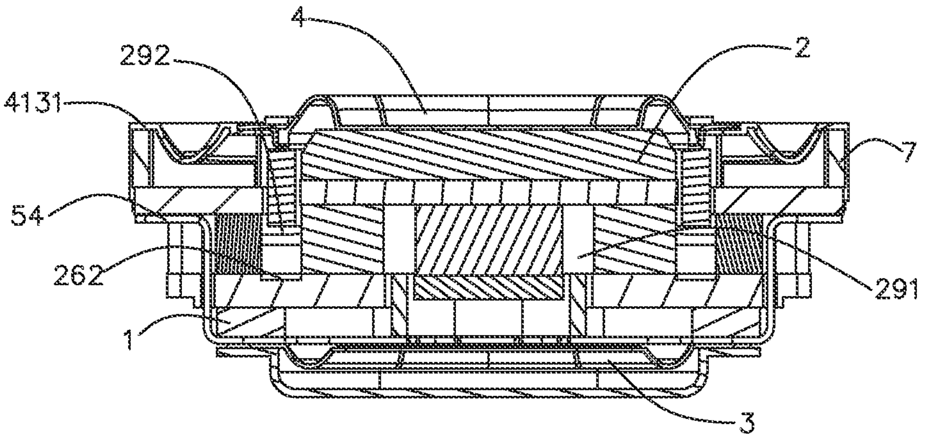
FIG. 6 is an illustrative cross-sectional view of the coaxial speaker taken along line A-A of FIG. 1.
Figure 7:
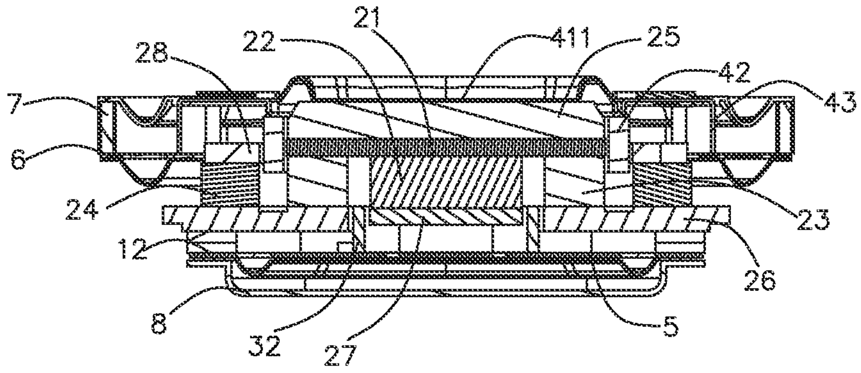
FIG. 7 is an illustrative cross-sectional view of the coaxial speaker taken along line B-B of FIG. 1.

Referring to the FIGS. 1-7, the present invention provides one embodiment of a coaxial speaker 100. The coaxial speaker 100 includes a frame 1, a magnetic circuit system 2 mounted on the frame 1, a first vibration system 3 fixed on a side of the frame 1 distal to the magnetic circuit system 2, a second vibration system 4 fixed on a side of the magnetic circuit system 2 distal to the frame 1, a first circuit board 5, an elastic assembly 6 elastically suspending the second vibration system 4, and a support shelf 7 fixed on the second vibration system 4, and a cover 8 covered above the first vibration system 3. The first vibration system 3 locates coaxially with the second vibration system 4.

The frame 1 is substantially rectangular, which can be a steel ring. The frame 1 includes an upper surface 11, a lower surface 12 opposite to the upper surface 11, and an inner surface 13 and an outer surface 14 connecting upper surface 11 and the lower surface 12. The magnetic circuit system 2 is fixed to the upper surface 11 of the frame 1, and the first vibration system 3 is fixed to the lower surface 12 of the frame 1. The frame 1 provides a leakage channel 15 passing through the inner surface 13 and the outer surface 14. The leakage channel 15 may not penetrate the upper surface 11 and the lower surface 12, or may penetrate at least one of the upper surface 11 and lower surface 12.

The magnetic circuit system 2 includes a magnetic guiding plate 21, a first magnet 22 disposed on a side of the magnetic guiding plate 21 proximal to the first vibration system 3, a second magnet 23 surrounding the first magnet 22 and spaced apart from the first magnet 22, a third magnet 24 surrounding the second magnet 23 and spaced apart from the second magnet 23, and a forth magnet 25 fixed on a side of the magnetic guiding plate 21 proximal to the second vibration system 4, a magnetic bowl 26 supporting the second magnet 23 and the third magnet 24, a first pole plate 27 stacked under the first magnet 22, and a second pole plate 28 stacked above the third magnet 24. The first magnet 22 and the second magnet 23 are fixed on a bottom surface of the magnetic guiding plate 21. The magnetic bowl 26 has a through hole 261. The first magnet 22, the first pole plate 27 form a first magnetic gap 291 with the second magnet 23 and an inner side wall of the magnetic bowl 26 which enclosing the through hole 261. The forth magnet 25, the magnetic guiding plate 21, and the second magnet 23 stack in sequence and form a second magnetic gap 292 with the third magnet 24 and the second pole plate 28. An avoiding portion 293 is provided on a stacking structure of the magnetic bowl 26 and the third magnet 24.

The magnetic guiding plate 21, the first magnet 22, the second magnet 23, the third magnet 24, the fourth magnet 25, the magnetic bowl 26, the first pole plate 27, and the second pole plate 28 are arranged coaxially, and the second magnet 23, the third magnet 24, the magnetic bowl 26, and the second pole plate 28 are hollow annular structures. The first magnet 22 and the second magnet 23 are arranged corresponding to a bottom of the forth magnet 25. The first magnet 22, the second magnet 23, the third magnet 23, and the forth magnet 25 are magnetized along a vibration direction of the coaxial speaker 100, and the first magnet 22, the third magnet 24, and the forth magnet 25 are magnetized in same directions, and the first magnet 22 and second magnet 23 are magnetized in opposite directions. The magnetic bowl 26 is mounted on a side of the frame 1 away from the first vibration system 3. The second pole plate 28 is fixed on the support shelf 7.

The first vibration system 3 includes a first diaphragm 31 and a first voice coil 32 driving the first diaphragm 31 to generate sounds. The first voice coil 32 at least partially locates into the first magnetic gap 291. The first diaphragm 31 is used for generating treble sound, and a sound direction of the first diaphragm 31 is downward along the vibration direction, that is, a sounding direction of the first diaphragm 31 is in back of the coaxial speaker 100. Alternatively, the first diaphragm 31 can also be used as a receiver to emit sound. The first diaphragm 31 may be an integral structure or a separated structure. The first diaphragm 31 includes a first dome 311, a first suspension 312 surrounding the first dome 311. The first suspension 312 is a structure recessing along a direction away from the magnetic circuit system 2. The first suspension 312 includes a first connection end 3121 attached and fixed to the first dome 311 and a second connection end 3122 connecting with the cover 8. The leakage channel 15 communicates an outside world to a space enclosed by the first diaphragm 31 and the magnetic circuit system 2, that is, the space enclosed by the first diaphragm 31, the frame 1, the magnetic bowl 26, the second magnet 23, the magnetic guiding plate 21, the first magnet 22, and the first pole plate 27 communicates to the outside world only through the leakage channel 15 of the frame 1.

The second vibration system 4 includes a second diaphragm 41, a second voice coil 42 driving the second diaphragm 41 to generate sounds, and a voice coil support 43 connecting to the second diaphragm 41. The second voice coil 42 at least partially locates into the second magnetic gap 292. When the first diaphragm 31 is used for generating treble sound, the second diaphragm 41 is used for generating bass sound, and the sound direction of the second diaphragm 41 is upward along the vibration direction, that is, the sounding direction of the second diaphragm 41 is in front of the coaxial speaker 100. When the first diaphragm 31 is used for the receiver for generating sound, the second diaphragm 41 can be used as an anti-phase noise cancellation device to improve the acoustic performance of the receiver.

The second diaphragm 41 may be an integral structure or a separated structure. The second diaphragm 41 includes a second dome 411, a second suspension 412 surrounding the second dome 411, a third suspension 413 surrounding the second suspension 412 and spaced apart from the second suspension 412, and a third dome 414 located between the second suspension 412 and the third suspension 413. The second dome 411 is fixed attached to the forth magnet 25. The second suspension 412 is a structure recessing along a direction closed to the magnetic circuit system 2. In present embodiment, the third dome 414 is a pair of sheet-like structures, and is disposed between the second suspension 412 and the third suspension 413 in a short axis direction of the coaxial speaker 100. The third suspension 413 includes a third connection end 4131. The third connection end 4131 is fixed on a top surface of the support shelf 7, and extends to cover part of a side surface of the support shelf 7. The support shelf 7 is an annular structure.

A recessing portion 262 is provided on the magnetic bowl 26 corresponding to a position of the second voice coil 42 to provide enough vibration space for the second voice coil 42.

The first circuit board 5 supplies power to the first voice coil 32, and the first circuit board 5 includes a first fixing portion 51 sandwiched between the first diaphragm 31 and the first voice coil 32, a second fixing portion 52 sandwiched between the first diaphragm 31 and the frame 1, an elastic first connecting portion 53 connecting the first fixing portion 51 and the second fixing portion 52, and a welding portion 54 bending and extending from the second fixing portion 52 to the second pole plate 28. A number of the first fixing portions 51 is two, both sides of the first voice coil 32 provides with one first fixing portion 51. The first circuit board 5 further includes a second connecting portion 55 connecting the two first fixing portions 51. The first fixing portion 51, the second fixing portion 52, the first connecting portion 53, and the second connecting portion 55 of the first circuit board 5 are all flat-plate structures. The second connection end 3122 of the first suspension 312 is connected to the second fixing portion 52 of the first circuit board 5. The avoiding portion 293 of the magnetic bowl 26 and the third magnet 24 is used for avoiding the welding portion 54.

The elastic assembly 6 connects the voice coil support 43 and the support shelf 7. The elastic assembly 6 includes a second circuit board 61 and a support membrane 62 connected with the second circuit board 61. The second circuit board 61 is electrically connected to the second voice coil 42 for powering for the second voice coil 42. Specifically, the coaxial speaker 100 further includes a terminal 9 connected to the second circuit board 61, and the second voice coil 42 is electrically connected to the second circuit board 61 through the terminal 9. In this embodiment, the number of the elastic assemblies 6 is two, and each elastic assembly 6 is arranged in a direction of the short axis of the coaxial speaker 100. In other embodiments, the position of the elastic assembly 6 may be determined according to the situation.

The voice coil support 43 includes a flat portion 431 attached to the third dome 414, a first extending portion 432 bending and extending from one end of the flat portion 431 to the second voice coil 42 and connected to the second voice coil 42, and a second extending portion 433 bending and extending from the other end of the flat portion 431 to the elastic assembly 6 and connected to the elastic assembly 6.

A perforation 81 is provided on the cover 8 for emitting the sound generated by the first diaphragm 31.

Compared with related technologies, the present invention provides a coaxial speaker including a frame, a magnetic circuit system mounted on the frame, a first vibration system fixed on a side of the frame distal to the magnetic circuit system, and a second vibration system fixed on a side of the magnetic circuit system distal to the frame. The second vibration system locates coaxially with the first vibration system. The first vibration system includes a first diaphragm and a first voice coil driving the first diaphragm to generate sounds, and the second vibration system includes a second diaphragm and a second voice coil driving the second diaphragm to generate sounds. The magnetic circuit system includes a magnetic guiding plate, a first magnet disposed on a side of the magnetic guiding plate proximal to the first diaphragm, a second magnet surrounding the first magnet and spaced apart from the first magnet to form a first magnetic gap, a third magnet surrounding the second magnet and spaced apart from the second magnet, and a forth magnet fixed on a side of the magnetic guiding plate proximal to the second diaphragm. The forth magnet, the magnetic guiding plate, and the second magnet stack in sequence and form a second magnetic gap with the third magnet. The first voice coil at least partially locates into the first magnetic gap, and the second voice coil at least partially locates into the second magnetic gap. The coaxial speaker in present invention arranges an annular bass vibration system on one end thereof for providing bass sound, a treble vibration system disposed on the other end thereof for providing treble sound. The sounding direction of the bass sound is in front of the coaxial speaker, and the sounding direction of the treble sound is in back of the coaxial speaker. Bass sound and treble sound form a full-range speaker, providing high-quality sound. Two voice coils using a common part of the magnetic circuit system can further reduce the cost and improve the acoustic performance, and an overall height of the coaxial speaker is reduced. The treble vibration system of the coaxial speaker of the present invention can also function as the receiver, and now the bass portion can be used as an anti-phase noise cancellation device to improve the acoustic performance of the receiver.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A coaxial speaker, comprising:

a frame;

a magnetic circuit system mounted on the frame;

a first vibration system fixed on a side of the frame distal to the magnetic circuit system, the first vibration system comprising a first diaphragm and a first voice coil driving the first diaphragm to generate sounds; and a second vibration system fixed on a side of the magnetic circuit system distal to the frame, the second vibration system located coaxially with the first vibration system, the second vibration system comprising a second diaphragm and a second voice coil driving the second diaphragm to generate sounds;

wherein the magnetic circuit system comprises a magnetic guiding plate, a first magnet disposed on a side of the magnetic guiding plate proximal to the first diaphragm, a second magnet surrounding the first magnet and spaced apart from the first magnet to form a first magnetic gap, a third magnet surrounding the second magnet and spaced apart from the second magnet, and a forth magnet fixed on a side of the magnetic guiding plate proximal to the second diaphragm, the forth magnet, the magnetic guiding plate, and the second magnet stacked in sequence and forming a second magnetic gap with the third magnet, the first voice coil at least partially located into the first magnetic gap, the second voice coil at least partially located into the second magnetic gap.

2. The coaxial speaker as described in claim 1, wherein the first magnet, the second magnet, the third magnet, and the forth magnet are magnetized along a vibration direction of the coaxial speaker, and the first magnet, the third magnet, and the forth magnet are magnetized in same directions, and the first magnet and second magnet are magnetized in opposite directions.

3. The coaxial speaker as described in claim 2, wherein the magnetic circuit system comprises a magnetic bowl supporting the second magnet and the third magnet, a first pole plate stacked under the first magnet, and a second pole plate stacked above the third magnet, the magnetic bowl mounted on a side of the frame away from the first diaphragm.

4. The coaxial speaker as described in claim 3, wherein the coaxial speaker further comprises a first circuit board powering the first voice coil, the first circuit board comprising a first fixing portion sandwiched between the first diaphragm and the first voice coil, a second fixing portion sandwiched between the first diaphragm and the frame, an elastic first connecting portion connecting the first fixing portion and the second fixing portion, and a welding portion bending and extending from the second fixing portion to the second pole plate.

5. The coaxial speaker as described in claim 4, wherein a number of the first fixing portions is two, both sides of the first voice coil providing with one first fixing portion, and the first circuit board further comprising a second connecting portion connecting the two first fixing portions.

6. The coaxial speaker as described in claim 5, wherein the first diaphragm comprises a first dome and a first suspension surrounding the first dome, the first suspension connected to the second connecting portion of the first circuit board.

7. The coaxial speaker as described in claim 4, wherein an avoiding portion is provided on the magnetic bowl and the third magnet corresponding to a position of the welding portion for avoiding the welding portion.

8. The coaxial speaker as described in claim 2, wherein the coaxial speaker further comprises a support shelf, the second diaphragm comprising a second dome, a second suspension surrounding the second dome, a third suspension surrounding the second suspension and spaced apart from the second suspension, and a third dome located between the second suspension and the third suspension, the second dome fixed attached to the forth magnet, and the third suspension fixed attached to the support shelf.

9. The coaxial speaker as described in claim 8, wherein the second vibration system further comprises a voice coil support connecting the second diaphragm, the coaxial speaker further comprising an elastic assembly elastically suspending the second vibration system, the voice coil support comprising a flat portion attached to the third dome, a first extending portion bending and extending from one end of the flat portion to the second voice coil and connected to the second voice coil, and a second extending portion bending and extending from the other end of the flat portion to the elastic assembly and connected to the elastic assembly.

10. The coaxial speaker as described in claim 1, wherein a leakage channel is provided of the frame, the leakage channel communicating an outside world to a space enclosed by the first diaphragm and the magnetic circuit system.

* * * * *